(12) United States Patent
Zhang et al.

(10) Patent No.: US 10,651,740 B1
(45) Date of Patent: May 12, 2020

(54) BUCK-BOOST CONVERTER FOR AN ELECTRIC DRIVE

(71) Applicant: GM GLOBAL TECHNOLOGY OPERATIONS LLC, Detroit, MI (US)

(72) Inventors: Mingyuan Zhang, Shanghai (CN); Chengwu Duan, Shanghai (CN); Lei Hao, Troy, MI (US); Jian Yao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/354,279

(22) Filed: Mar. 15, 2019

(51) Int. Cl.
   *H02M 3/158* (2006.01)
   *H02G 5/00* (2006.01)
   *H02M 7/46* (2006.01)

(52) U.S. Cl.
   CPC ............ *H02M 3/1582* (2013.01); *H02G 5/00* (2013.01); *H02M 7/46* (2013.01)

(58) Field of Classification Search
   CPC ..... H02M 3/156–3/158; H02M 3/1588; Y02B 70/1466; G05F 1/62; B60W 20/00; B60W 10/06; B60W 10/08
   USPC ............................ 323/234, 282–285; 701/22
   See application file for complete search history.

(56) References Cited

U.S. PATENT DOCUMENTS

| | | | | |
|---|---|---|---|---|
| 9,387,766 B2 * | 7/2016 | Hao | ...................... | H02M 3/00 |
| 10,110,103 B1 * | 10/2018 | Hao | ...................... | H02P 6/06 |
| 2011/0011658 A1 * | 1/2011 | Takizawa | ...................... | B60L 3/0092 180/65.31 |
| 2015/0124412 A1 * | 5/2015 | Keegan | ...................... | H02M 7/5387 361/734 |
| 2016/0075241 A1 * | 3/2016 | Hao | ...................... | H02M 3/00 701/22 |

* cited by examiner

*Primary Examiner* — Yemane Mehari
(74) *Attorney, Agent, or Firm* — Reising Ethington P.C.; Vincent Yu (57) ABSTRACT

An electric drive system for a vehicle may include positive and negative bus rails carrying a direct current (DC) bus voltage, an energy storage system (ESS), a power inverter having a plurality of semiconductor switches operable for inverting the DC bus voltage into an alternating current (AC) bus voltage, and an electric machine. A DC-DC converter may be connected to the bus rails between the capacitor and the power inverter and may include a converter semiconductor switch disposed in the positive bus rail, an inductor coil connected to the positive bus rail and receiving current flowing through the converter semiconductor switch, at least one diode, and a bypass switch connected to the positive bus rail and configured to allow current to bypass the converter. The DC-DC converter may be configured to output a DC bus voltage to the power inverter with a same polarity as the battery polarity.

20 Claims, 8 Drawing Sheets

BUCK-BOOST CONVERTER FOR AN ELECTRIC DRIVE

INTRODUCTION

Hybrid or battery electric vehicles may employ an electric machine or motor-generator to generate torque to propel the vehicle. Alternatively, the torque provided by the electric machine may be used generate electricity. Electricity generated in excess of required amounts may be stored in a battery pack for later use.

Electric machines may be embodied as a polyphase/alternating current device, and therefore electric drive systems may include a power inverter. Pulse width modulation may be used to supply power from a battery or power source to the electric machine, e.g., where a voltage output of the power inverter is controlled via the transmission of electronic gate signals to sets of semiconductor switches of the power inverter. During power generating modes, switching control of the power inverter converts the polyphase voltage from the electric machine into a direct current voltage suitable for storage in the battery pack. Likewise, switching control of the power inverter is able to convert a direct current voltage into a polyphase voltage to drive the electric machine during motoring modes. A boost or buck-boost converter may also be used to selectively increase an output voltage of the battery pack and thereby meet maximum speed requirements of the electric machine and connected electrical components.

Known buck-boost converter designs employ multiple MOSFET switches (in one known example, four MOSFET switches) in order to selectively buck/boost output voltage, and thus are relatively complex and induce switching losses. Additionally, known buck-boost converter designs reverse the polarity of the output voltage. Accordingly, there is a need for an improved buck-boost converter that addresses the above shortcomings.

SUMMARY

In at least some examples, an electric drive system includes positive and negative bus rails carrying a direct current (DC) bus voltage, and an energy storage system (ESS) connected to the positive and negative bus rails. The ESS may have battery cells and a first capacitor arranged in parallel with the battery cells to provide a battery output voltage having a battery polarity. The electric drive system may further include a power inverter having a first plurality of semiconductor switches operable for inverting the DC bus voltage into an alternating current (AC) bus voltage, an electric machine having phase windings that are electrically connected to the power inverter, and a DC-DC converter connected to the positive and negative bus rails between the capacitor and the power inverter. The converter may include a converter semiconductor switch disposed in the positive bus rail, an inductor coil connected to the positive bus rail and receiving current flowing through the converter semiconductor switch, at least one diode configured to direct current flowing through the power inverter and the electric machine via the inductor coil, and a bypass switch connected to the positive bus rail and configured to allow current to bypass the converter and flow through the power inverter and electric machine when the bypass switch is closed, and a second capacitor arranged across the positive and negative bus rails. The DC-DC converter may be configured to output a DC bus voltage to the power inverter with a same polarity as the battery polarity. The electric drive system may also include a controller programmed to regulate operation of the DC-DC converter based on power, torque, and speed values of the electric machine, to adjust the DC bus voltage until the DC bus voltage is equal to the battery output voltage, to selectively bypass the DC-DC converter by closing the bypass switch under predetermined operating conditions of the electric machine when the DC bus voltage is equal to the battery output voltage, and to selectively open the bypass switch and thereafter regulate the DC bus voltage to a predetermined voltage, wherein the DC-DC converter outputs the DC bus voltage with the same polarity as the battery polarity when the bypass switch is opened, and wherein the DC-DC converter outputs the DC bus voltage with the same polarity as the battery polarity when the bypass switch is closed.

In some examples, the converter semiconductor switch is a MOSFET.

In at least some examples, the at least one diode includes a plurality of diodes.

The at least one diode may, in some example approaches, include a single diode permitting current to flow from the positive bus rail to the inverter. In at least some of these examples, the inductor coil may be connected in series between the converter semiconductor switch and the single diode.

In some example illustrations of an electric drive system, the at least one diode is configured to cause current to flow from the positive bus rail into the inductor coil in a first direction. In these examples, the inductor coil may be connected to the inverter such that current flowing through the inductor coil in the first direction flows directly to the positive bus rail of the inverter from the inductor coil. In a further subset of these examples, the at least one diode includes a second diode configured to allow current to flow from the inductor coil in the first direction to the positive bus rail of the inverter.

In some examples, the predetermined operating conditions of the electric machine when the controller bypasses the DC-DC converter such that the DC bus voltage is equal to the battery output voltage are high-power/high-torque operating conditions of the electric machine.

Some example illustrations are directed to an electric drive system for an electric machine, with the electric drive system including positive and negative bus rails carrying a direct current (DC) bus voltage, and an energy storage system (ESS) connected to the positive and negative bus rails, where the ESS has battery cells and a first capacitor arranged in parallel with the battery cells to provide a battery output voltage having a battery polarity. The electric drive system may also include a power inverter having a first plurality of semiconductor switches operable for inverting the DC bus voltage into an alternating current (AC) bus voltage, and a DC-DC converter connected to the positive and negative bus rails between the capacitor and the power inverter. The converter may have a converter semiconductor switch disposed in the positive bus rail, an inductor coil connected to the positive bus rail and receiving current flowing through the converter semiconductor switch, at least one diode configured to direct current flowing through the power inverter via the inductor coil, and a bypass switch connected to the positive bus rail and configured to allow current to bypass the converter and flow through the power inverter when the bypass switch is closed, and a second capacitor arranged across the positive and negative bus rails, the DC-DC converter configured to output a DC bus voltage to the power inverter with a same polarity as the battery polarity.

In some of the example electric drive systems, the converter semiconductor switch is a MOSFET.

In some example approaches, the at least one diode includes a plurality of diodes. In a subset of these examples, the at least one diode includes a single diode permitting current to flow from the positive bus rail to the inverter. The inductor coil, in some example illustrations, may be connected in series between the converter semiconductor switch and the single diode.

In some examples, the at least one diode is configured to cause current to flow from the positive bus rail into the inductor coil in a first direction. In some of these examples, the inductor coil is connected to the inverter such that current flowing through the inductor coil in the first direction flows directly to the positive bus rail of the inverter from the inductor coil. In some examples, the at least one diode includes a second diode configured to allow current to flow from the inductor coil in the first direction to the positive bus rail of the inverter.

In some example approaches, the predetermined operating conditions of the electric machine when the controller bypasses the DC-DC converter such that the DC bus voltage is equal to the battery output voltage are high-power/high-torque operating conditions of the electric machine.

Some example illustrations herein are directed to a vehicle comprising an electric drive system configured to provide output torque to at least one vehicle wheel. The electric drive system may include positive and negative bus rails carrying a direct current (DC) bus voltage, and an energy storage system (ESS) connected to the positive and negative bus rails. The ESS may have battery cells and a first capacitor arranged in parallel with the battery cells to provide a battery output voltage having a battery polarity. The electric drive system of the vehicle may also include a power inverter having a first plurality of semiconductor switches operable for inverting the DC bus voltage into an alternating current (AC) bus voltage, an electric machine having phase windings that are electrically connected to the power inverter, and a DC-DC converter connected to the positive and negative bus rails between the capacitor and the power inverter. The converter may include a converter semiconductor switch disposed in the positive bus rail, an inductor coil connected to the positive bus rail and receiving current flowing through the converter semiconductor switch, at least one diode configured to direct current flowing through the power inverter and the electric machine via the inductor coil, and a bypass switch connected to the positive bus rail and configured to allow current to bypass the converter and flow through the power inverter and electric machine when the bypass switch is closed, and a second capacitor arranged across the positive and negative bus rails, the DC-DC converter configured to output a DC bus voltage to the power inverter with a same polarity as the battery polarity. The electric drive system of the vehicle may also include a controller programmed to regulate operation of the DC-DC converter based on power, torque, and speed values of the electric machine, to adjust the DC bus voltage until the DC bus voltage is equal to the battery output voltage, to selectively bypass the DC-DC converter by closing the bypass switch under predetermined operating conditions of the electric machine when the DC bus voltage is equal to the battery output voltage, and to selectively open the bypass switch and thereafter regulate the DC bus voltage to a predetermined voltage, wherein the DC-DC converter outputs the DC bus voltage with the same polarity as the battery polarity when the bypass switch is opened, and wherein the DC-DC converter outputs the DC bus voltage with the same polarity as the battery polarity when the bypass switch is closed.

In at least some example illustrations of a vehicle, the vehicle is a battery electric vehicle (BEV).

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Example illustrations herein are generally directed to systems and methods for a vehicle employing an electric motor-generator for propulsion, e.g., an electric or hybrid vehicle. A buck-boost converter may be used to selectively increase/decrease output voltage to the electric motor-generator. Alternatively, in a bypass mode of the converter, the output voltage applied to the electric machine or motor-generator is equal to the voltage received from the vehicle energy storage system or battery.

Example buck-boost converters may have a bypass design and generally improve the efficiency of the vehicle drive system, and also be less complex and expensive compared with previous approaches. A power supply connects to the DC bus directly when motor operates in relatively high-power conditions, e.g., as may be typical of usage of a bypass mode. Additionally, the power supply connects to the DC bus through the converter in a buck-boost mode when motor operates on high speed conditions or low speed conditions, and the converter may decrease or increase output voltage applied to the electric machine. The improved efficiency of the inventive converter results in improved energy economy, increasing range of the vehicle under electric power. By comparison, in previous approaches a buck-boost converter generally operates in a buck-boost mode at all times, reducing efficiency. Moreover, in example approaches the converter may employ only a single switching device in addition to the bypass switch, reducing switching losses.

In example illustrations herein, a DC-DC converter may be connected to positive and negative bus rails of an electric drive of a vehicle between a capacitor and a power inverter. The converter may have a converter semiconductor switch disposed in the positive bus rail and an inductor coil connected to the positive bus rail and receiving current flowing through the converter semiconductor switch. The converter may further include at least one diode configured to direct current flowing through the power inverter and electric machine through the inductor coil and a bypass switch connected to the positive bus rail. The bypass switch may be configured to allow current to flow through the power inverter and electric machine when the bypass switch is closed. A second capacitor may be arranged across the positive and negative bus rails. The DC-DC converter may be configured to output a DC bus voltage to the power inverter with a same polarity as the battery polarity. Accordingly, example converters may employ a bypass switch and a single converter switch, reducing switching losses compared to previous approaches where multiple switches in addition to a bypass switch are typical.

Figure 1:
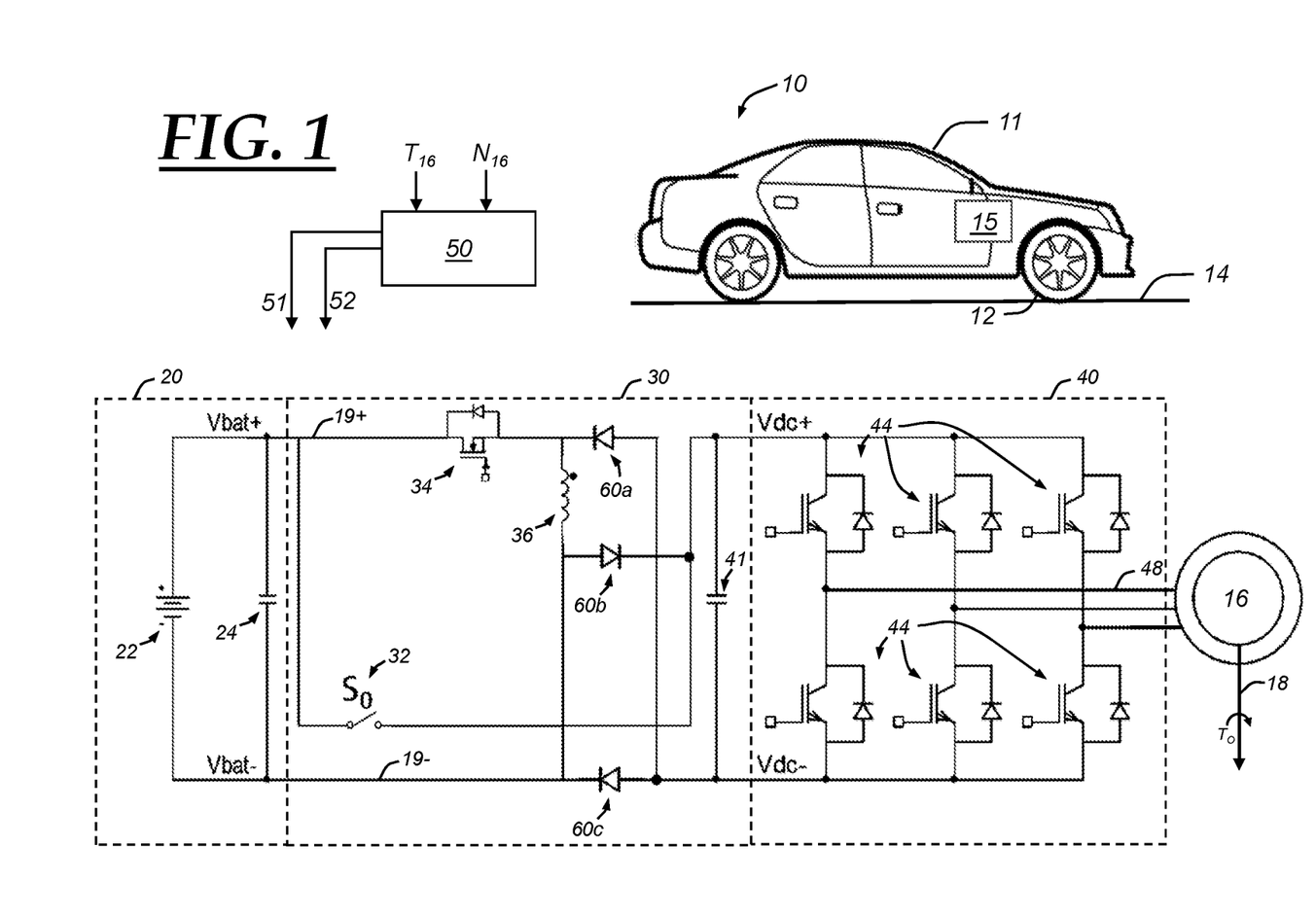
FIG. 1 is a schematic diagram depicting an example of a vehicle having an electric drive using a DC-DC converter, according to an example illustration.

Referring now to the drawings, where like reference numbers refer to like components throughout the several views, FIG. 1 depicts a schematic example vehicle 10 having a body 11 and an electric drive system 15. The vehicle 10 may be configured as a motor vehicle as shown, and therefore may be equipped with wheels 12 in rolling contact with a road surface 14. While the vehicle 10 of FIG. 1 is an example of a type of system benefiting from use of the present drive system 15, other applications for the drive system 15 may be readily envisioned, including but not limited to stationary power plants, mobile platforms, and other types of land, air, or marine vehicles.

The electric drive system 15 may include a polyphase electric machine 16 having a rotatable output shaft 18. When the electric machine 16 is energized via application of an alternating current (AC) polyphase voltage (VAC) to individual phase windings 48 of the electric machine 16, motor torque (arrow $T_O$) is generated and delivered to a coupled load, such as the road wheels 12 in the illustrated motor vehicle application. The electric machine 16 may be embodied as a three-phase/multi-phase motor or motor/generator unit, with each of the phase windings 48 carrying a corresponding phase current. In various example embodiments, the electric machine 16 may be constructed as an induction machine or as a synchronous machine with or without permanent magnets within its rotor.

The electric drive system 15 of FIG. 1 may also include an energy storage system (ESS) 20, a direct-current/direct-current (DC-DC) converter 30, and a power inverter 40. The ESS 20 may include a plurality of battery cells 22, e.g., rechargeable lithium ion battery cells arranged in a stack, and a capacitor 24 arranged in parallel with the battery cells 22. The number and arrangement of battery cells 22 may vary with the intended application. Merely by way of example, in an example 96 or more such battery cells 22 may be used in certain high-voltage applications. A battery output voltage (Vbat+, Vbat−) is delivered to respective positive and negative voltage bus rails 19+, 19−, with a DC bus voltage (Vdc+ and Vdc−) present on the voltage bus rails 19+, 19− downstream of/on the output side of the DC-DC converter 30 as shown.

Within the electric drive system 15, the power inverter 40 is electrically connected to the phase windings 48 of the electric machine 16 and includes a first plurality of semiconductor switches 44 and a second capacitor 41. The semiconductor switches 44 are arranged in upper and lower sets as shown, with the terms "upper" and "lower" referring to the semiconductor switches 44 connected to the positive and negative bus rails 19+ and 19−, respectively. The semiconductor switches 44 may be embodied as voltage-controlled bipolar switching devices in the form of insulated gate bipolar transistors (IGBTs), metal-oxide semiconductor field effect transistors (MOSFETs), wideband GaN devices (WBG), or other suitable switches having a corresponding gate (G) to which a gate signal 51 is applied, e.g., by a controller 50, to change the on/off state of a given one of the semiconductor switches 44.

Still referring to FIG. 1, the DC-DC converter 30 in the illustrated embodiment may be configured as a buck-boost converter having a semiconductor switch 34, with the term "buck" referring to a voltage-reducing mode of operation and "boost" referring to a voltage-increasing mode of operation. As with the semiconductor switches 44 within the power inverter 40, the semiconductor switch 34 of the converter 30 may be constructed of highly efficient switches such as wide-gap gallium nitride (GaN) or silicon carbide (SiC) MOSFETs, IGBTs, or another suitable switching device. Further within the converter 30, an inductor coil 36 extends between the switch 34 and the negative bus rail 19−. Additionally, a plurality of diodes 60a, 60b, 60c (collectively, 60) are provided.

In some examples, e.g., as illustrated in FIG. 1 and in other examples that follow, one of the diodes 60b permits current to flow from the positive bus rail 19+ to the inverter 40. In such examples, the inductor coil 36 may be connected in series between the converter semiconductor switch 34 and the diode 60b. Accordingly, in a converter mode of the converter 30 (i.e., when the bypass switch 32 is opened), the diode 60b generally causes current to flow from the positive bus rail 19+ into the inductor coil 36 in a first direction (moving down the page in the example illustrated in FIG. 1). Current flowing through the inductor coil 36 in this first direction then flows directly to the positive bus rail 19+ of the inverter 40 from the inductor coil 36. In some examples, and as shown in FIG. 1, a second diode 60a is also provided, which is positioned such that current flows through the inductor coil 36 in the first direction and then flows from the inductor coil 36 to the positive bus rail 19+ of the inverter 40.

The DC-DC converter 30 of FIG. 1 additionally includes a bypass switch 32, also labeled S0. The bypass switch 32 is selectively opened or closed in response to switching control signals 52 transmitted by the controller 50. The bypass switch 32 may include any switching device that is convenient. Merely as examples, the bypass switch 32 may be constructed of an electromechanical relay when response time is not critical, or alternatively of a faster-acting semiconductor device such as efficient bi-directional block solid-state IGBT switches or reverse blocking IGBTs. The bypass switch 32 is disposed on the positive voltage bus rail 19+, as illustrated in FIG. 1. Accordingly, closing of the bypass switch 32 in response to the switching control signals 52 causes the DC-DC converter 30 to be bypassed, with the particular conditions calling for closing of the bypass switch 32 and the resultant bypassing of the converter 30 determined in real-time by the controller 50 as set forth below with reference to FIG. 6.

The controller 50, which is in communication with the electric machine 16 over a controller area network or other communication bus, e.g., of the vehicle 10, may be configured as a single device or as a distributed control device. Although omitted from FIG. 1, connectivity of the controller 50 to the electric drive system 15 may include transfer conductors and/or wireless control links or paths suitable for transmitting and receiving the switching control signals 52. The controller 50 may include a processor and tangible, non-transitory memory, including read-only memory in the form of optical, magnetic, or flash memory. The controller 50 may also include sufficient amounts of random access memory and electrically-erasable programmable read only memory, as well as a high-speed clock, analog-to-digital and digital-to-analog circuitry, and input/output circuitry and devices, as well as appropriate signal conditioning and buffer circuitry. Computer-readable instructions are recorded in a memory of the controller 50 embodying a method 100 (e.g., as described further below in FIG. 6), with the execution of such logic by the processor causing the controller 50 to manage the flow of electrical power within the electric drive system 15.

As will be described further below, in example methods, the controller 50 is programmed to receive a reported motor torque (arrow $T_{16}$), e.g., an estimated or calculated value approximating the motor output torque (arrow $T_O$). Such a value may be available from a motor control processor (not shown) of the electric machine 16 using, for instance, a lookup table indexed or referenced by the calculated power and measured or reported rotational speed value (arrow $N_{16}$) of the electric machine 16. The controller 50 uses the reported motor torque value (arrow $T_{16}$) and the speed value (arrow $N_{16}$) to determine precisely when to open or close the bypass switch 32.

The vehicle 10 may employ a calibrated or pre-defined performance map (not shown) generally describing usage of the example electric machine 16 and the example buck-boost-type converters 30/30*b*/30*c* disclosed herein based on power and speed of the electric machine 16 at different operating points. Generally, it may be desirable to have the electric machine 16 output higher torque for a given rotating speed of the electric machine 16, depending on whether power output or energy economy of the electric machine 16 are greater considerations. To this end, the converter 30 may vary output voltage sent to the electric machine 16, and bypass switch 32 may be used to selectively bypass the converter 30 where adjustments to the battery output voltage is not desired. Merely as one example, the electric machine 16 may have a maximum rotational speed of about 12,000 revolutions per minute (RPM), and a maximum output torque of 350 Newton-meters (Nm). To the extent the vehicle 10 does not require 100% of available output power of the electric machine 16 at any given speed or torque of the electric machine 16, the converter 30 may be used to adjust output voltage supplied to the electric machine 16. In this manner, power of the energy storage systems (ESS) 22 may be conserved.

As will be explained in further detail with reference to example methods below, the controller 50 of FIG. 1 is configured via programming and hardware equipment to monitor performance parameters of the electric machine 16 and, in response to such monitored performance parameters, to selectively operate the DC-DC converter 30 in one or more operating zones of the electric machine 16, adjusting output voltage to the electric machine 16 as needed using the DC-DC converter 30. More specifically, where there is a desire to increase output speed of the electric machine 16 at a given engine torque or range thereof, the converter 30 may operate to "boost" output voltage to the electric machine 16 to do so. Alternatively, where there is a desire to conserve energy stored in the ESS 22, e.g., when the machine 16 is operated at a relatively low speed and in a low power condition, the converter 30 may reduce or "buck" output voltage to the electric machine 16. Moreover, if no adjustment of the output voltage is needed, the converter 30 may be bypassed entirely by closing the bypass switch 32. Closing the bypass switch 32 may advantageously reduce switching losses due to pulse width modulation effects of the converter 30.

Example methods of using the converter described herein may generally be executed to ensure that the energy stored in the inductor coil 36 is effectively dissipated before activation of the bypass switch 32, and to thereby ensure efficient operation of the DC-DC converter 30. For example, during buck mode or boost mode, the DC voltage at the input to the power inverter 40 may be set to a fixed predefined value to reduce cost and simplify control, as well as to capture most of the available fuel economy benefit, or the DC-DC converter 30 may be controlled to an optimal level to reduce system losses, with voltage controlled as a function of speed, duty cycle, and/or power consumption of the electric machine 16. Hysteresis may be added when switching from one mode of the DC-DC converter 30 to another, e.g., from buck mode to boost mode or vice versa. When closing the bypass switch 32, example methods may be executed so that voltage across the bypass switch 32 is kept at or near zero. This may in turn avoid undesirable voltage transients. The bypass switch 32 may then be closed by operation of the controller 50 when the bus voltage (Vdc+, Vdc−) is nearly equal to the battery output voltage (Vbat+, Vbat−).

After the DC-DC converter 30 is effectively bypassed by operation of the bypass switch 32, energy stored in the inductor coil 36 is dissipated. Energy dissipation may be achieved by controlling the open/closed state of a switch present in the converter 30, e.g., switch 34 as illustrated in FIG. 1 in a manner that shorts the inductor coil 36 while controlling the electrical current passing through the bypass switch 32 to a level that is less than a rated current for the switch 34.

Figure 2A:
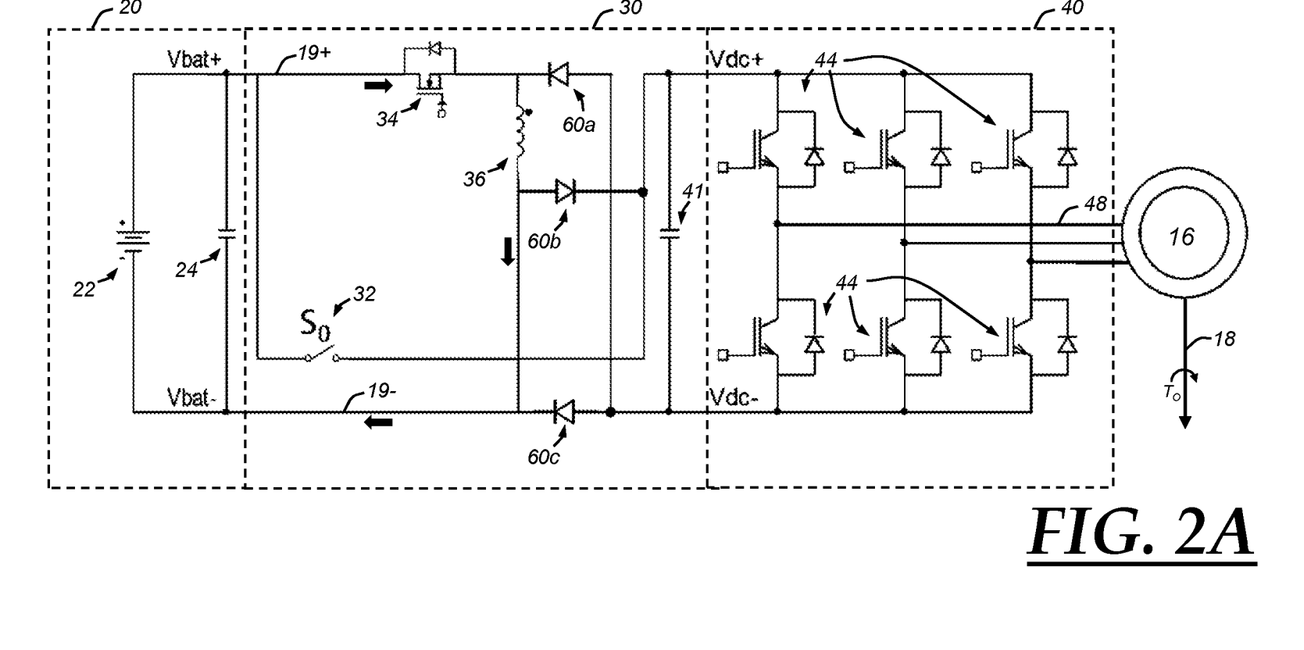
FIG. 2A is a schematic circuit diagram of the electric drive of FIG. 1 in a converter mode, where a switch in the converter is closed.
Figure 2B:
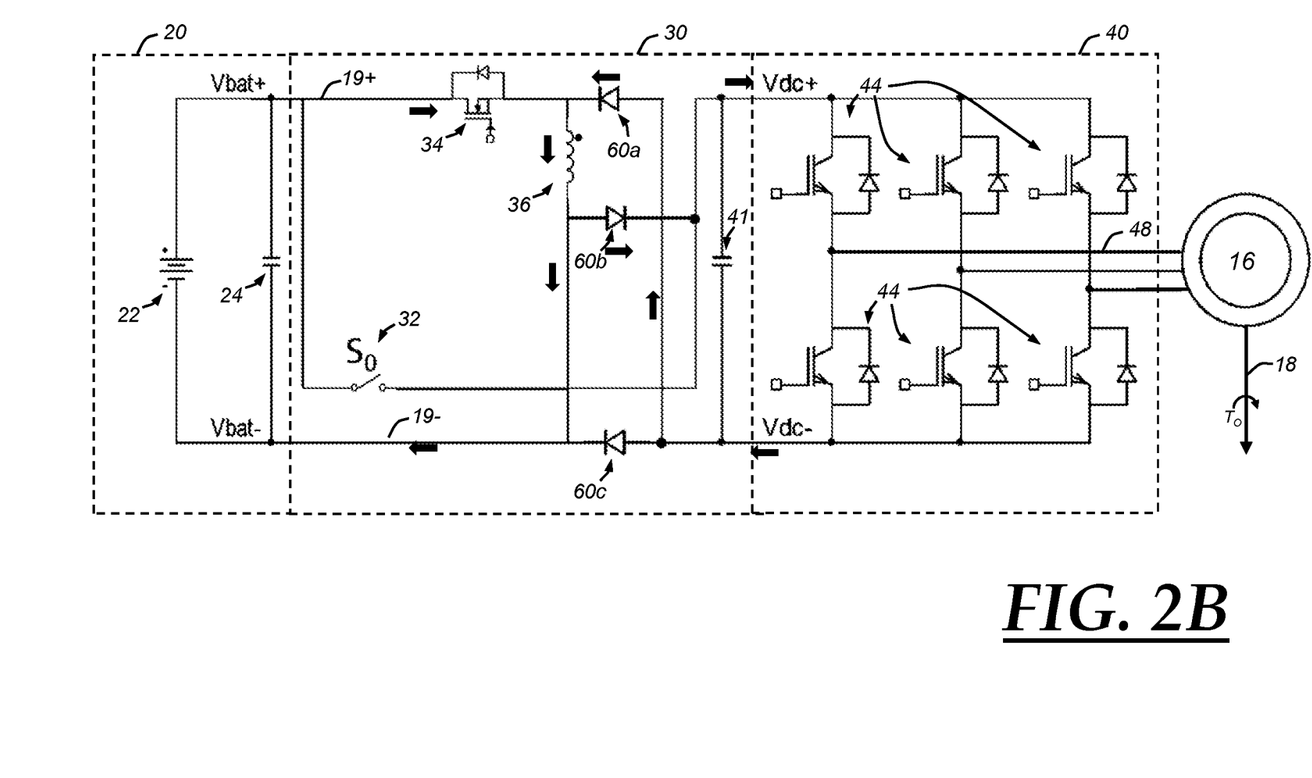
FIG. 2B is a schematic circuit diagram of the electric drive of FIG. 1 in a converter mode, where the switch in the converter is open.
Figure 2C:
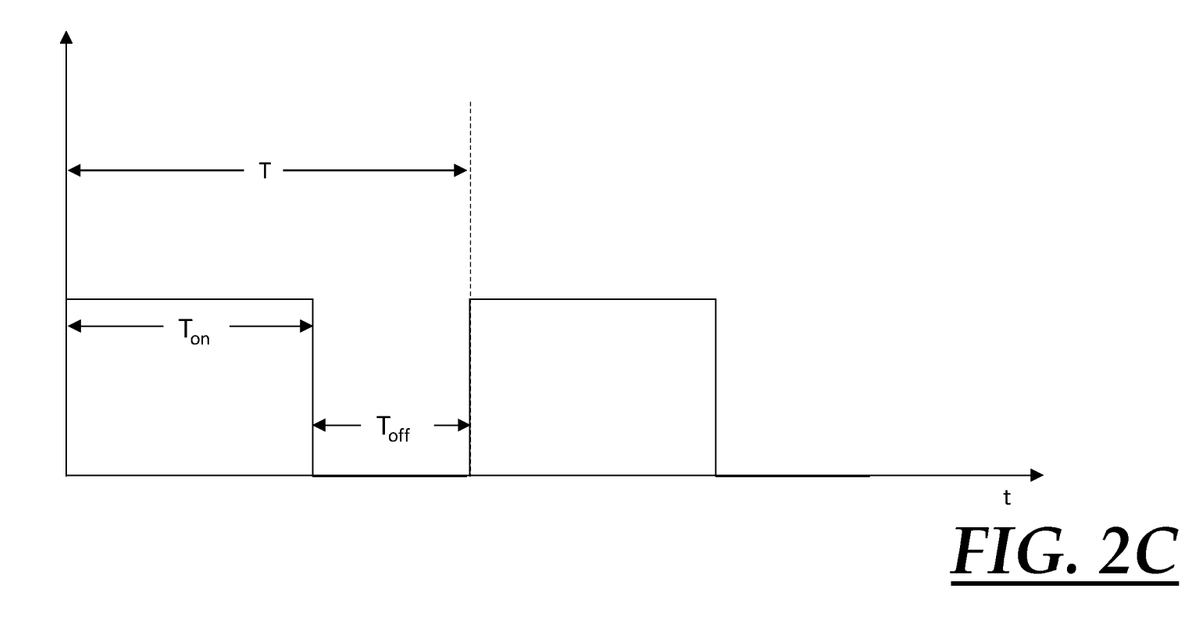
FIG. 2C is an illustration of voltage output of the converter of FIGS. 2A and 2B over time, with the switch alternating between the open and closed positions.

Turning now to FIGS. 2A-2C, operation of the converter 30 in a converter mode, i.e., where the converter 30 either reduces ("buck" mode) or increases ("boost" mode) output voltage to the electric machine 16 from the input voltage received from the ESS 22, is described in further detail. As illustrated in FIG. 2A, with the bypass switch 32 open, the switching device 34 may permit current (indicated by arrows in the Figures) to flow through the switch 34 and the inductor 36, and back to the ESS 22/capacitor 24. Merely as one example, the switch 34 may be a MOSFET that is controlled to allow current to flow through the switch 34. Turning to FIG. 2B, upon deactivation of the MOSFET switch 34, the inductor 36 causes current to flow through diode 60*b*, thereby applying voltage from the inductor 36 to the plurality of switching devices 44. By alternating activation of the MOSFET switch 34, output voltage applied to the electric machine 16 may be dictated by a duty ratio of the switch 34, as follows:

$$\text{Duty ratio: } D = \frac{t_{on}}{t_{on} + t_{off}}$$

$$\text{Output voltage: } \frac{V_o}{V_i} = \frac{D}{1-D} = f(D)$$

Accordingly, the converter 30 may decrease or increase output voltage applied to the electric machine 16 as desired, thereby increasing energy efficiency or output speed capabilities of the vehicle 10 overall, respectively. Moreover, the polarity of the DC bus 19+ advantageously remains the same as the supply voltage, while reducing switching losses via the use of the diodes 60 and the single switch 34. By comparison, previous approaches to DC-DC converters employed multiple switches in addition to a bypass switch, resulting in increased switching losses and adding complexity to the converter.

Figure 3:
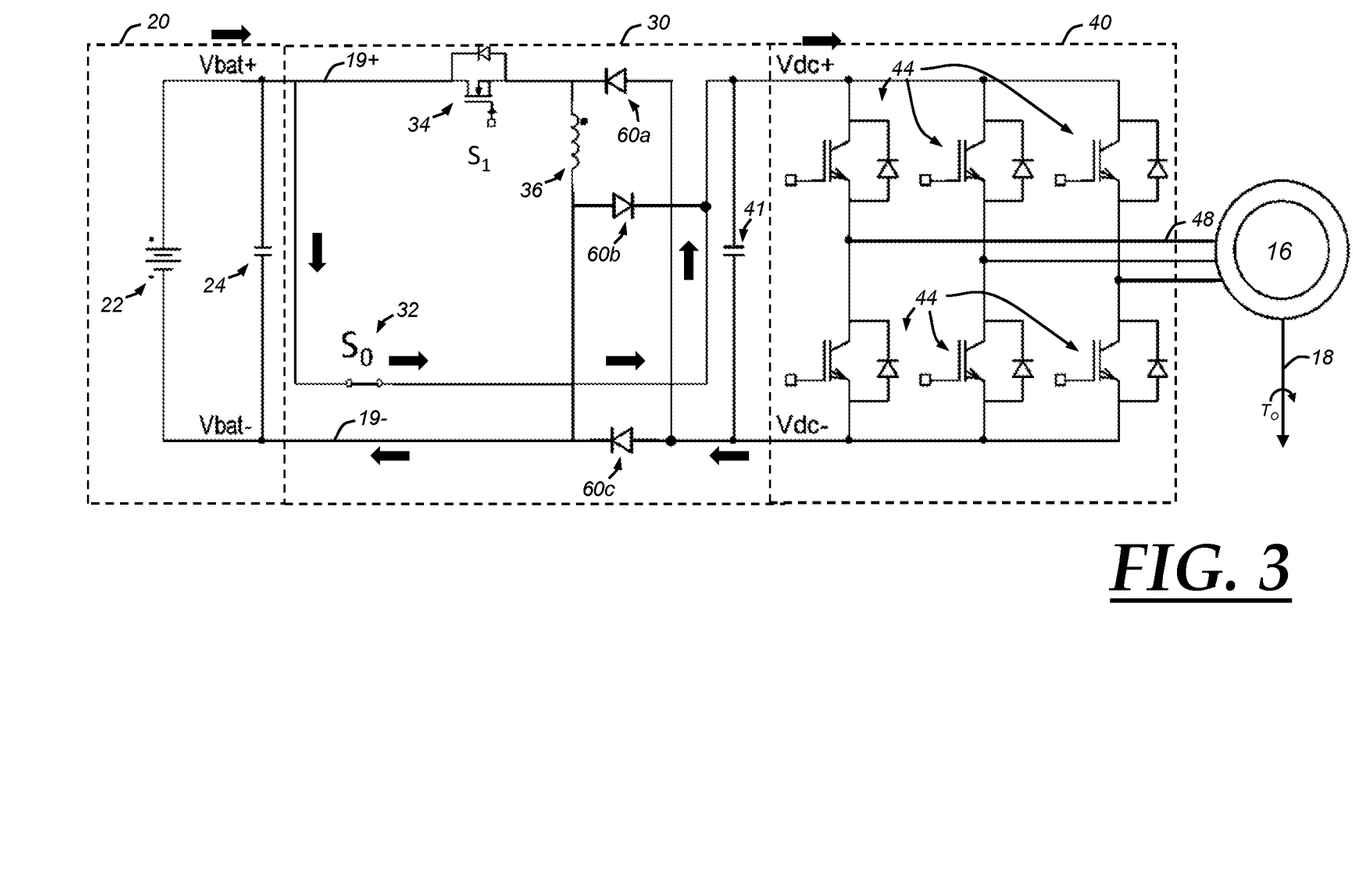
FIG. 3 is a schematic circuit diagram of the electric drive of FIGS. 1, 2A, and 2B in a bypass mode.

Turning now to FIG. 3, the converter 30 is illustrated in a bypass mode, wherein the bypass switch 32 is closed. Accordingly, the voltage of the ESS 22 is applied directly to the inverter 40, thereby bypassing the switch 34. With the converter 30 in bypass mode, polarity of the DC bus (Vdc+) remains the same as the supply voltage (Vbat+).

Figure 4:
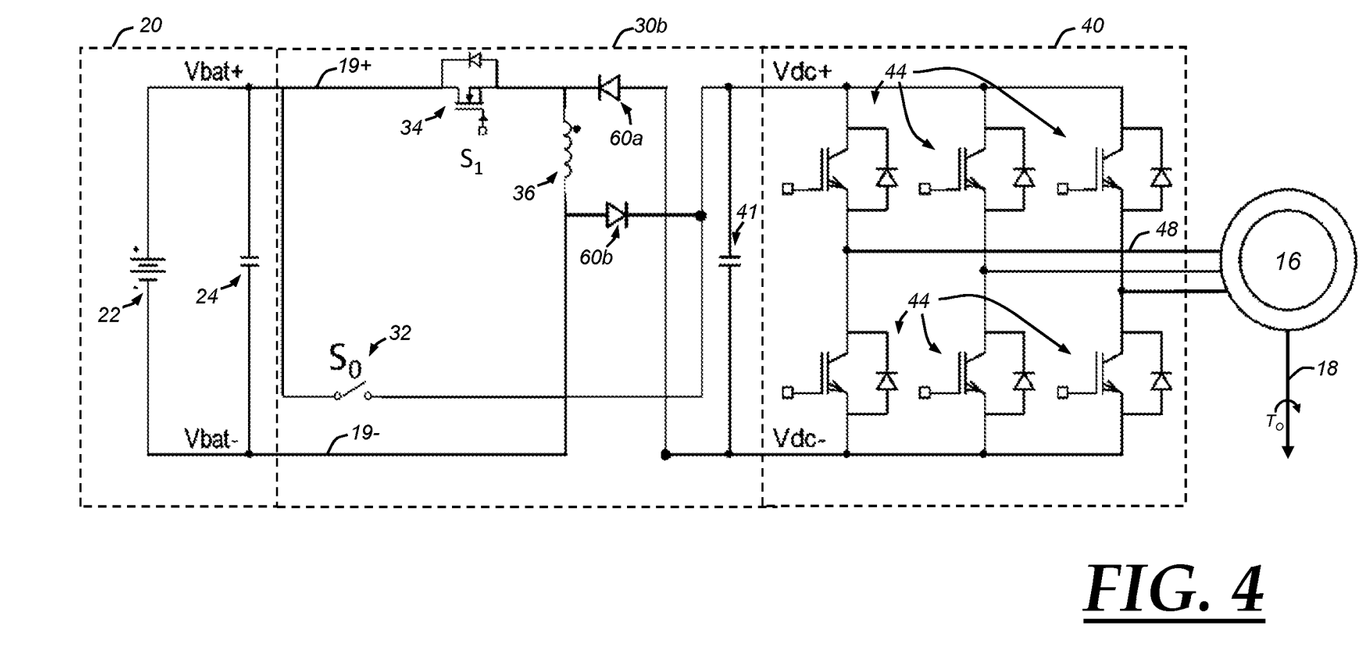
FIG. 4 is a schematic circuit diagram of another converter for the electric drive of FIG. 1, where the converter utilizes two diodes.

Referring now to FIG. 4, another example converter 30b is illustrated. The converter 30b is identical to the converter 30 illustrated in FIGS. 2A, 2B, and 3, but utilizes two diodes 60a, 60b (instead of using three diodes in the foregoing examples). In the example converter 30b illustrated in FIG. 4, the converter 30b essentially allows a conversion mode (i.e., buck-boost) mode and a bypass mode in similar manner as described above for the converter 30 illustrated in FIGS. 2A, 2B, and 3, although direction of current flow may vary compared with the example converter 30 illustrated in FIGS. 2A, 2B, and 3. The converter 30b allows fewer operating components and minimal complexity by using fewer diodes 60, while the additional diode 60c in the example converter 30 illustrated in FIGS. 2A, 3B, and 3 may generally simplify changes between the bypass and converter modes, thereby decreasing response time.

Figure 5:
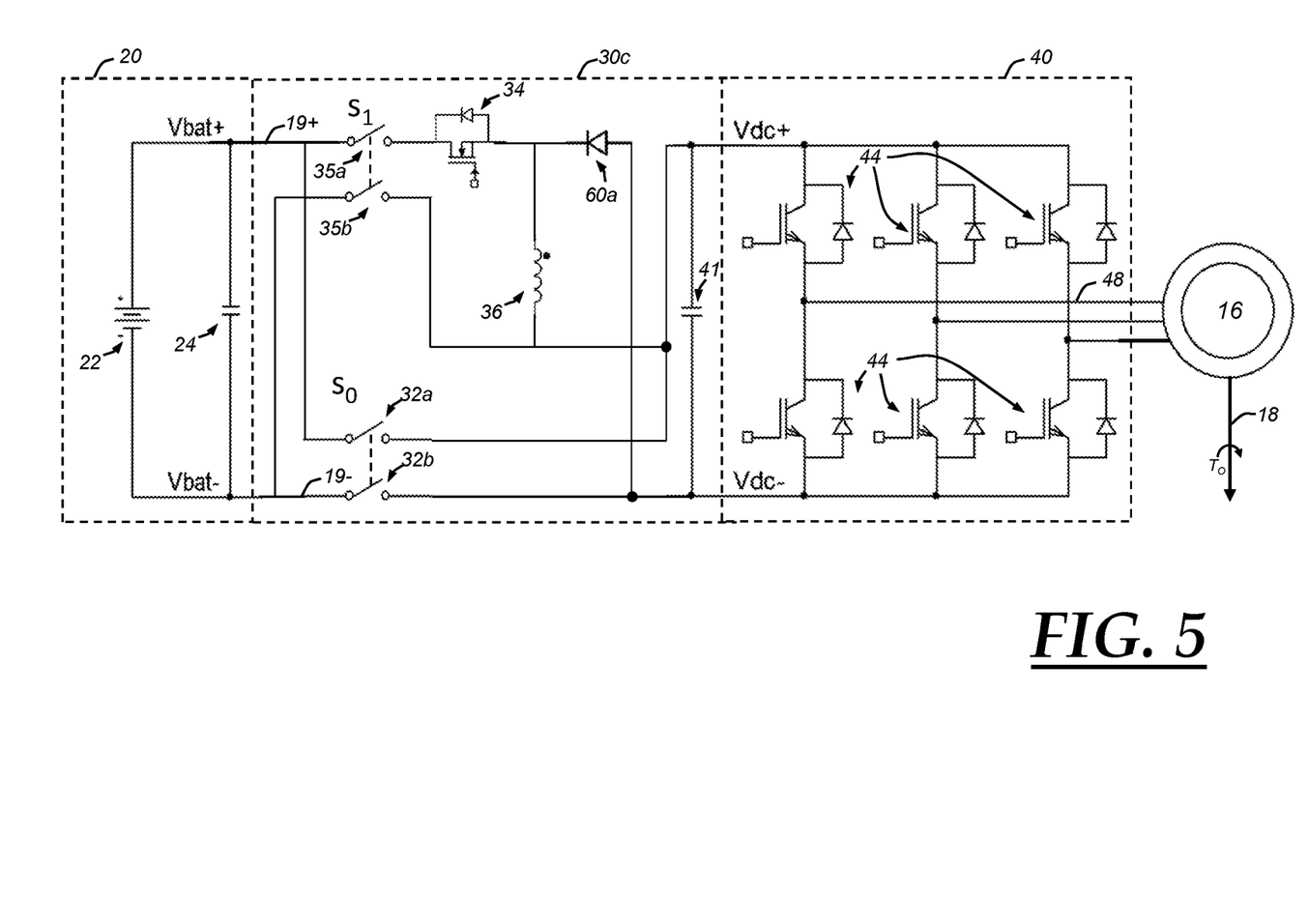
FIG. 5 is a schematic circuit diagram of a converter for the electric drive of FIG. 1, where the converter utilizes interlocking switches.

In another example converter 30c illustrated in FIG. 5, interlock switches 32, 35 are employed, although operation of the converter 30c is otherwise substantially identical to that of converters 30, 30b. More specifically, interlocking switches 32a, 32b may generally be used to bypass the converter 30c, such that the output voltage applied to the inverter is the same as that received from the ESS 22. Alternatively, when the bypass switches 32a, 32b are opened, the switches 35a, 35b may be closed to allow current to flow through the switch 34 and inducing current in the induction coil 36.

Figure 6:
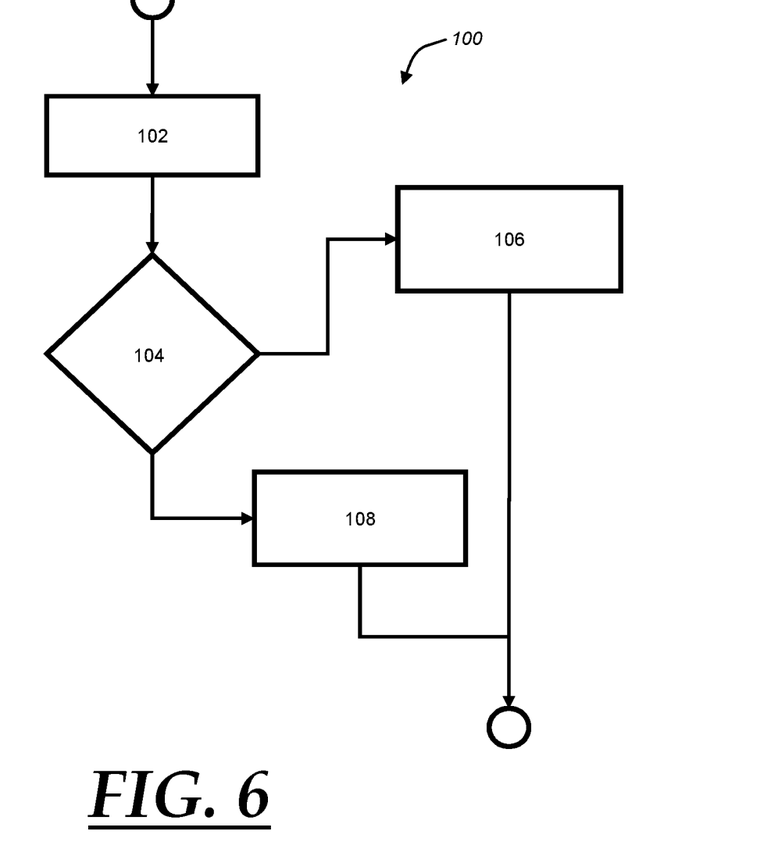
FIG. 6 is an example process flow diagram, illustrating example methods of applying an output voltage to an electric machine.

Turning now to FIG. 6, an example process 100 is disclosed for implementing control of an electric machine 16 in a vehicle. At block 102, a controller 50 may determine the operating speed and torque of the electric machine 16. For instance, the voltage and current may be measured at each phase winding 48 of the electric machine 16 in an example three-phase system. Torque may be measured, calculated or estimated as a function of the voltage, current, and speed of the electric machine 16, and/or recorded in a lookup table in memory of the controller 50. Process 100 may then proceed to block 104.

At block 104, the controller 50 may determine whether it may be desired to employ a buck-boost mode of the converter 30, thereby allowing adjustment of output voltage applied to the inverter 40. Merely by way of example, output voltage may be reduced where it is desired to conserve energy stored in the ESS 22, e.g., where a relatively low demand for speed is being made by an operator of the vehicle 10, or the vehicle operator is not demanding to increase vehicle speed. By contrast, where it is desired to increase output voltage applied to the electric machine 16, such as where there is a demand for increased speed in the vehicle 10, the converter 30 may increase or "boost" output voltage.

Where it is desired to use the buck-boost mode of the converter 30, process 100 may proceed to block 106, where the converter 30 is placed into buck-boost mode by opening the bypass switch, e.g., bypass switch 32. For example, the controller 50 may activate the DC buck-boost converter 30 by opening the bypass switch 32. Block 106 may include transmitting the switching signal 51 in a form that opens the bypass switch 32. Block 108 thus effectively sets the output voltage applied to the inverter 40 equal to a multiple of the voltage of the ESS 22. In some embodiments, the multiplier (n) may be between 2-4 times the level of the voltage of the ESS 22, or more.

Alternatively, it may be desirable to close the bypass switch 32 of the converter, thereby applying voltage of the ESS 22 directly to the inverter 44. This bypass mode may be employed, e.g., where voltage of the ESS 22 is within a desired range appropriate for power/energy economy requirements of the vehicle 10, or where it is desired to reduce switching losses that otherwise may be experienced in the buck-boost mode of the converter 30. Where it is desired to use the bypass mode of the converter, process 100 may proceed to block 108, where the bypass switch is opened. Accordingly, the controller 50 may deactivate the DC buck-boost converter 30 via control of the bypass switch 32. Closing the bypass switch 32 effectively sets the inverter input voltage equal to the voltage of the ESS 22, i.e., the battery voltage.

Example methods such as process 100 generally allow the converter 30 to be bypassed, e.g., in high-power regions of operation of the electric machine 26. Likewise, the converter 30 may be enabled at higher speeds and low-power modes of operation to improve overall drive efficiency. In boost mode, the inverter input may be set to a predefined value suitable for capturing a desirable amount of fuel economy benefit with a downsized DC buck-boost converter 30. For instance, in a 90-kW peak power example of the electric machine 26, little additional improvement in EV range is gained at levels over 30 kW. Therefore, the converter 30 may be used to reduce output voltage applied to the inverter 40, thereby reducing power drawn from the battery 20.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electric drive system, comprising:
   positive and negative bus rails carrying a direct current (DC) bus voltage;
   an energy storage system (ESS) connected to the positive and negative bus rails, and having battery cells and a first capacitor arranged in parallel with the battery cells to provide a battery output voltage having a battery polarity;

a power inverter having a first plurality of semiconductor switches operable for inverting the DC bus voltage into an alternating current (AC) bus voltage;

an electric machine having phase windings that are electrically connected to the power inverter;

a DC-DC converter connected to the positive and negative bus rails between the capacitor and the power inverter, and having a converter semiconductor switch disposed in the positive bus rail, an inductor coil connected to the positive bus rail and receiving current flowing through the converter semiconductor switch, at least one diode configured to direct current flowing through the power inverter and the electric machine via the inductor coil, and a bypass switch connected to the positive bus rail and configured to allow current to bypass the converter and flow through the power inverter and electric machine when the bypass switch is closed, and a second capacitor arranged across the positive and negative bus rails, the DC-DC converter configured to output a DC bus voltage to the power inverter with a same polarity as the battery polarity; and a controller programmed to regulate operation of the DC-DC converter based on power, torque, and speed values of the electric machine, to adjust the DC bus voltage until the DC bus voltage is equal to the battery output voltage, to selectively bypass the DC-DC converter by closing the bypass switch under predetermined operating conditions of the electric machine when the DC bus voltage is equal to the battery output voltage, and to selectively open the bypass switch and thereafter regulate the DC bus voltage to a predetermined voltage, wherein the DC-DC converter outputs the DC bus voltage with the same polarity as the battery polarity when the bypass switch is opened, and wherein the DC-DC converter outputs the DC bus voltage with the same polarity as the battery polarity when the bypass switch is closed.

2. The electric drive system of claim 1, wherein the converter semiconductor switch is a MOSFET.

3. The electric drive system of claim 1, wherein the at least one diode includes a plurality of diodes.

4. The electric drive system of claim 1, wherein the at least one diode includes a single diode permitting current to flow from the positive bus rail to the inverter.

5. The electric drive system of claim 4, wherein the inductor coil is connected in series between the converter semiconductor switch and the single diode.

6. The electric drive system of claim 1, wherein the at least one diode is configured to cause current to flow from the positive bus rail into the inductor coil in a first direction.

7. The electric drive system of claim 6, wherein the inductor coil is connected to the inverter such that current flowing through the inductor coil in the first direction flows directly to the positive bus rail of the inverter from the inductor coil.

8. The electric drive system of claim 7, wherein the at least one diode includes a second diode configured to allow current to flow from the inductor coil in the first direction to the positive bus rail of the inverter.

9. The electric drive system of claim 1, wherein the predetermined operating conditions of the electric machine when the controller bypasses the DC-DC converter such that the DC bus voltage is equal to the battery output voltage are high-power/high-torque operating conditions of the electric machine.

10. The electric drive system of claim 1, wherein the at least one diode is configured to cause current to flow from the positive bus rail into the inductor coil in a first direction.

11. The electric drive system of claim 10, wherein the inductor coil is connected to the inverter such that current flowing through the inductor coil in the first direction flows directly to the positive bus rail of the inverter from the inductor coil.

12. The electric drive system of claim 11, wherein the at least one diode includes a second diode configured to allow current to flow from the inductor coil in the first direction to the positive bus rail of the inverter.

13. An electric drive system for an electric machine, comprising:

positive and negative bus rails carrying a direct current (DC) bus voltage;

an energy storage system (ESS) connected to the positive and negative bus rails, and having battery cells and a first capacitor arranged in parallel with the battery cells to provide a battery output voltage having a battery polarity;

a power inverter having a first plurality of semiconductor switches operable for inverting the DC bus voltage into an alternating current (AC) bus voltage; and a DC-DC converter connected to the positive and negative bus rails between the capacitor and the power inverter, and having a converter semiconductor switch disposed in the positive bus rail, an inductor coil connected to the positive bus rail and receiving current flowing through the converter semiconductor switch, at least one diode configured to direct current flowing through the power inverter via the inductor coil, and a bypass switch connected to the positive bus rail and configured to allow current to bypass the converter and flow through the power inverter when the bypass switch is closed, and a second capacitor arranged across the positive and negative bus rails, the DC-DC converter configured to output a DC bus voltage to the power inverter with a same polarity as the battery polarity when the bypass switch is opened and when the bypass switch is closed;

wherein the electric drive system is configured to regulate operation of the DC-DC converter based on power, torque, and speed values of the electric machine, to adjust the DC bus voltage until the DC bus voltage is equal to the battery output voltage, to selectively bypass the DC-DC converter by closing the bypass switch under predetermined operating conditions of the electric machine when the DC bus voltage is equal to the battery output voltage, and to selectively open the bypass switch and thereafter regulate the DC bus voltage to a predetermined voltage.

14. The electric drive system of claim 13, wherein the converter semiconductor switch is a MOSFET.

15. The electric drive system of claim 13, wherein the at least one diode includes a plurality of diodes.

16. The electric drive system of claim 13, wherein the at least one diode includes a single diode permitting current to flow from the positive bus rail to the inverter.

17. The electric drive system of claim 16, wherein the inductor coil is connected in series between the converter semiconductor switch and the single diode.

18. The electric drive system of claim 13, wherein the predetermined operating conditions of the electric machine when the DC-DC converter is bypassed such that the DC bus voltage is equal to the battery output voltage are high-power/high-torque operating conditions of the electric machine.

19. A vehicle, comprising:
an electric drive system configured to provide output torque to at least one vehicle wheel, the electric drive system including:
positive and negative bus rails carrying a direct current (DC) bus voltage;
an energy storage system (ESS) connected to the positive and negative bus rails, and having battery cells and a first capacitor arranged in parallel with the battery cells to provide a battery output voltage having a battery polarity;
a power inverter having a first plurality of semiconductor switches operable for inverting the DC bus voltage into an alternating current (AC) bus voltage;
an electric machine having phase windings that are electrically connected to the power inverter;
a DC-DC converter connected to the positive and negative bus rails between the capacitor and the power inverter, and having a converter semiconductor switch disposed in the positive bus rail, an inductor coil connected to the positive bus rail and receiving current flowing through the converter semiconductor switch, at least one diode configured to direct current flowing through the power inverter and the electric machine via the inductor coil, and a bypass switch connected to the positive bus rail and configured to allow current to bypass the converter and flow through the power inverter and electric machine when the bypass switch is closed, and a second capacitor arranged across the positive and negative bus rails, the DC-DC converter configured to output a DC bus voltage to the power inverter with a same polarity as the battery polarity; and
a controller programmed to regulate operation of the DC-DC converter based on power, torque, and speed values of the electric machine, to adjust the DC bus voltage until the DC bus voltage is equal to the battery output voltage, to selectively bypass the DC-DC converter by closing the bypass switch under predetermined operating conditions of the electric machine when the DC bus voltage is equal to the battery output voltage, and to selectively open the bypass switch and thereafter regulate the DC bus voltage to a predetermined voltage, wherein the DC-DC converter outputs the DC bus voltage with the same polarity as the battery polarity when the bypass switch is opened, and wherein the DC-DC converter outputs the DC bus voltage with the same polarity as the battery polarity when the bypass switch is closed.

20. The vehicle of claim 19, wherein the vehicle is a battery electric vehicle (BEV).

* * * * *